US008725977B2

(12) United States Patent
Moon et al.

(10) Patent No.: US 8,725,977 B2
(45) Date of Patent: May 13, 2014

(54) NVMHCI ATTACHED HYBRID DATA STORAGE

(75) Inventors: John Edward Moon, Superior, CO (US); Paul Francis Kusbel, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 422 days.

(21) Appl. No.: 12/707,346

(22) Filed: Feb. 17, 2010

(65) Prior Publication Data

US 2011/0202707 A1    Aug. 18, 2011

(51) Int. Cl.
*G06F 12/00* (2006.01)
*G06F 13/00* (2006.01)
*G06F 13/28* (2006.01)

(52) U.S. Cl.
USPC ........................ 711/170; 711/103; 711/112

(58) Field of Classification Search
USPC ..................................... 711/103, 112, 170
See application file for complete search history.

(56) References Cited

U.S. PATENT DOCUMENTS

| 5,592,641 | A | * | 1/1997 | Fandrich et al. | 711/103 |
| 6,016,530 | A | * | 1/2000 | Auclair et al. | 711/6 |
| 7,840,657 | B2 | * | 11/2010 | Moore et al. | 709/222 |
| 2002/0124129 | A1 | * | 9/2002 | Zilberman | 711/103 |
| 2008/0195833 | A1 | * | 8/2008 | Park | 711/171 |
| 2010/0161936 | A1 | * | 6/2010 | Royer et al. | 711/209 |

OTHER PUBLICATIONS

Boulton, C., "Intel Spearheads Memory Group in a 'Flash'", Jun. 5, 2007, pp. 1-2. http://www.enterpriseitplanet.com/storage/news/print.php/3681471.
Huffman, A., "Non-Volatile Memory Host Controller Interface (HVMHCI) 1.0", Apr. 14, 2008, pp. 1-65.

* cited by examiner

*Primary Examiner* — Stephen Elmore
*Assistant Examiner* — Mark Giardino, Jr.
(74) *Attorney, Agent, or Firm* — Cesari & Reed, LLP; Kirk A. Cesari; Christian W. Best

(57) ABSTRACT

A hybrid data storage device includes a solid-state memory device, a disc-type memory device and a hybrid data storage device controller in communication with the solid-state memory device and the disc-type memory device. The hybrid data storage device controller is configured to receive Non-Volatile Memory Host Controller Interface (NVMHCI) commands from a host and use logic to make decisions for the optimization and efficient performance of the solid-state memory device and the disc-type memory device.

20 Claims, 7 Drawing Sheets

NVMHCI ATTACHED HYBRID DATA STORAGE

BACKGROUND

A data storage system is an example of a system having at least one memory device or at least one medium for data storage. The data storage system can include one or more types of storage mediums such as, but not limited to, hard discs, floppy discs, magnetic discs, optical discs, magnetic tapes, solid-state storage components, and/or combinations thereof. For instance, an exemplary data storage system can be a hard disc drive (HDD), a solid-state drive (SDD) or a "hybrid" drive (e.g., a hybrid hard drive (HHD) having both hard disc media and solid state media) and etc.

A data storage system includes a controller that is configured to receive data, process commands from a host and implement data operations to the storage media in the data storage system based on the commands. The data storage system can include a plurality of memory devices accessible by the controller. For example, a hybrid hard drive can include a plurality of memory devices drive, such as a plurality of flash memory chips that are configured into a flash array and at least one rotatable disc medium.

The Non-volatile Memory Host Controller Interface (NVMHCI) Working Group has provided a standard software and hardware programming interface for solid-state memory systems called the NVMHCI protocol. The NVMHCI protocol can be applied to different databuses, for example the PCI express bus.

The discussion above is merely provided for general background information and is not intended to be used as an aid in determining the scope of the claimed subject matter.

SUMMARY

A hybrid data storage device includes a solid-state memory device, a disc-type memory device and a hybrid data storage device controller in communication with the solid-state memory device and the disc-type memory device. The hybrid data storage device controller is configured to receive Non-Volatile Memory Host Controller Interface (NVMHCI) commands from a host and use logic to make decisions for the optimization and efficient performance of the solid-state memory device and the disc-type memory device in the hybrid data storage device. Exemplary optimizations include the communication of optimal data transfer size to the host based on which of the solid-state or disc-type memories is being written, the determination of placing data on the solid-state or disc-type memories depending on power savings, read/write latencies and read/write frequencies and the optimal use a disc-type memory device in the erasing data blocks in a solid-state memory device.

Other features and benefits that characterize embodiments of the present invention will be apparent upon reading the following detailed description and review of the associated drawings.

DETAILED DESCRIPTION

Embodiments of the disclosure provide a command interpreter for incorporation into a controller of a hybrid data storage device. The command interpreter can accept Non-volatile Memory Host Controller Interface (NVMHCI) commands, interpret their meaning and give appropriate input to a processor of the hybrid data storage system for making the necessary decisions based on the NVMHCI commands.

Figure 1:
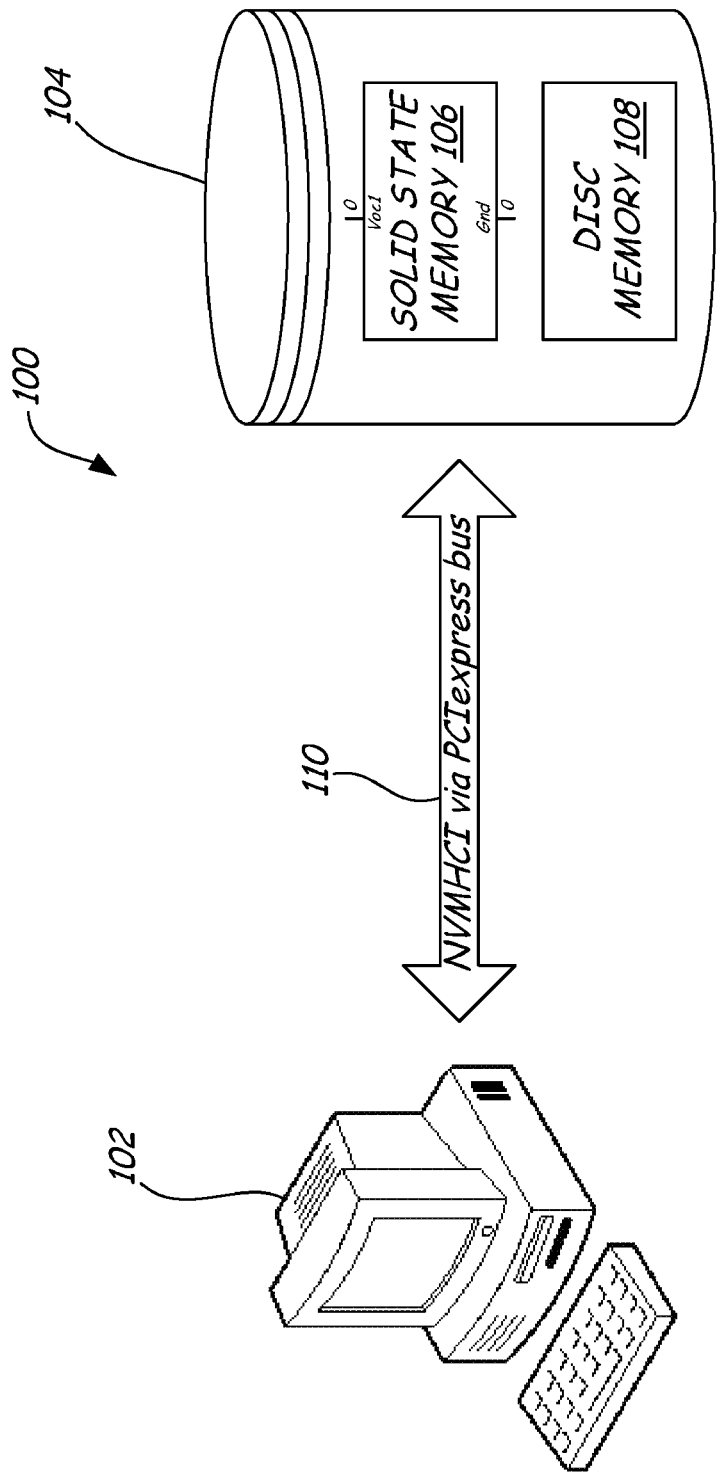
FIG. 1 illustrates a schematic diagram of a computing system under one embodiment.
Figure 2:
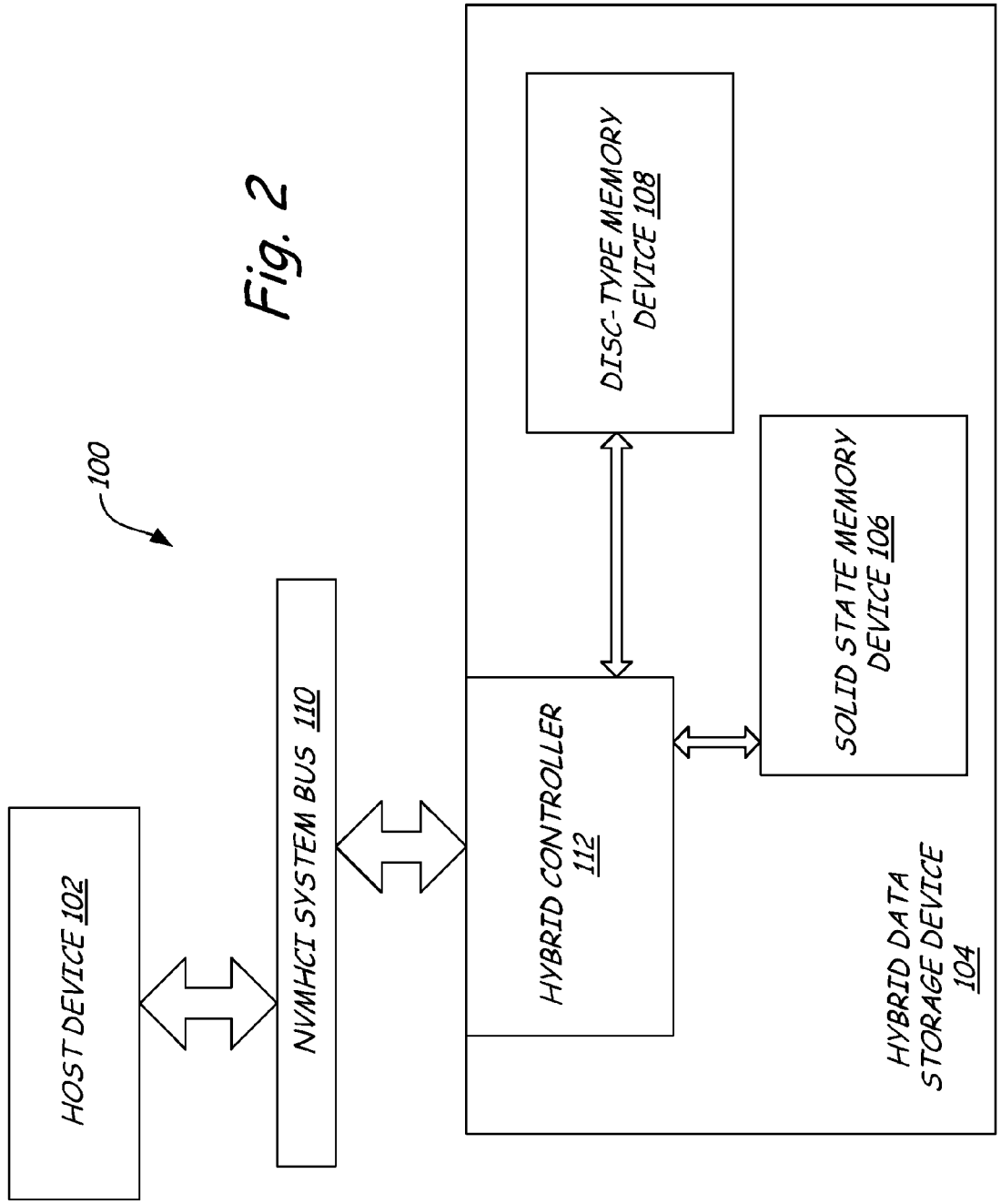
FIG. 2 illustrates a more detailed block diagram of the computing system illustrated in FIG. 1.

FIG. 1 illustrates a schematic diagram of a computing system 100 including a host device 102 and a hybrid data storage device 104. Hybrid data storage device 104 includes a solid-state memory device 106, such as Flash-type memory, and a disc-type memory device 108, such as magnetic or optical memory. Hybrid data storage device 104 and host 102 communicate over a physical system bus 110, such as a Peripheral Component Interconnect Express (PCIe), configured with a Non-volatile Memory Host Controller Interface (NVMHCI) protocol. FIG. 2 illustrates a more detailed block diagram of the computing system 100 illustrated in FIG. 1. As in FIG. 1, FIG. 2 illustrates a host device 102 in communication with a hybrid data storage device 104 over a bus 110 having a NVMHCI protocol. Besides hybrid data storage device 104 including a solid-state memory device 106 and a disc-type memory device 108 as illustrated in FIG. 1, FIG. 2 illustrates a hybrid controller 112 that processes the data communicated between the memory devices 106 and 108 and the host device 102.

Typically, a hybrid data storage device is attached to a host through standard data storage interface protocols, such as SATA or SCSI. However, these interfaces were not designed for solid-state memory and therefore fail to take full advantage of this type of memory in the same capacity as such memories attached to buses having a NVMHCI protocol. In order to maximize the advantages of operating a hybrid data storage device 104 under a NVMHCI protocol, one embodiment of hybrid controller 112 includes a command interpreter 128 and processor 114 as illustrated in FIG. 3.

Figure 3:
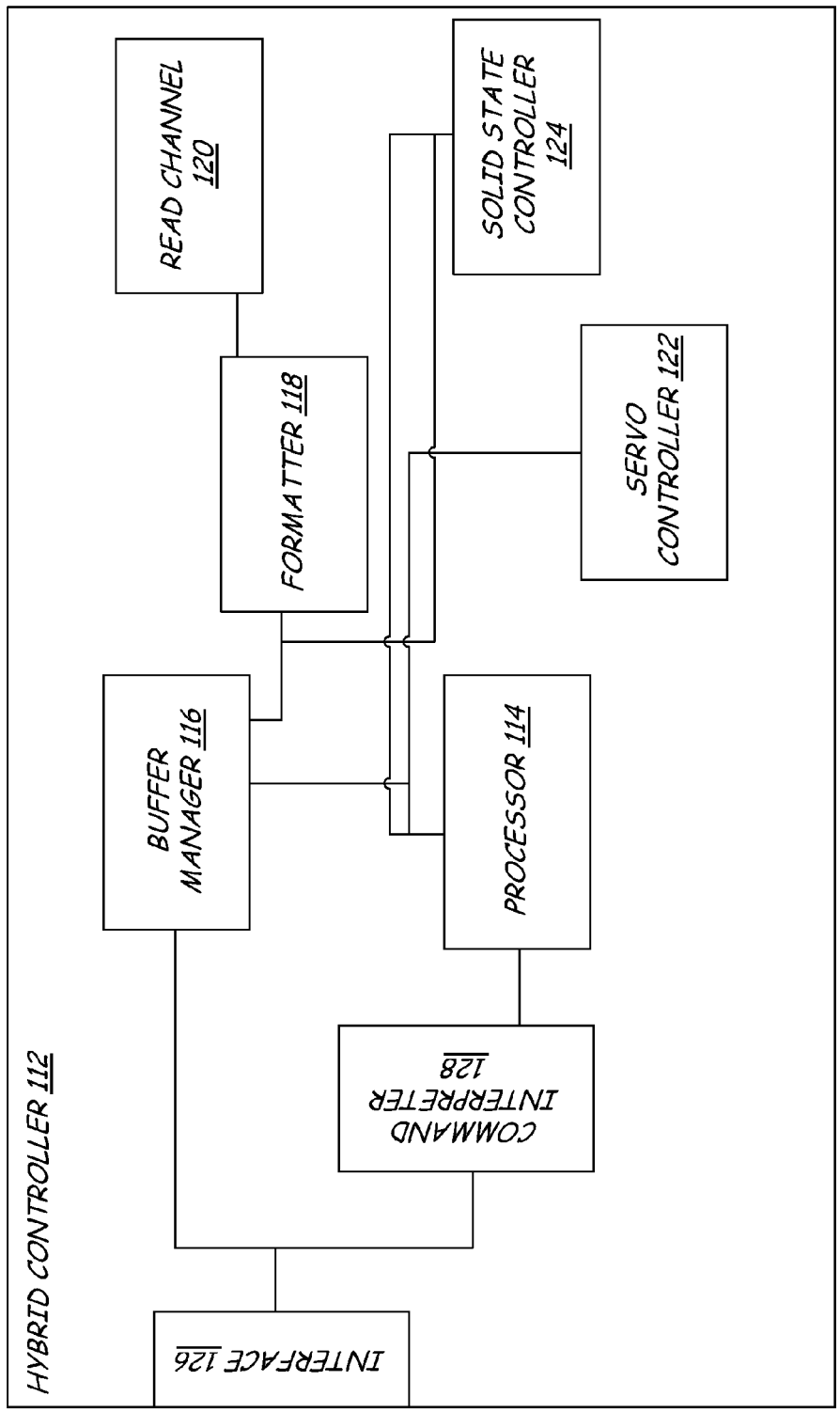
FIG. 3 illustrates a block diagram of the controller of a hybrid drive of the computing system illustrated in FIGS. 1 and 2.

FIG. 3 illustrates a block diagram of hybrid controller 112 of computing system 100 illustrated in FIGS. 1 and 2. Like other hybrid controllers, hybrid controller 112 includes a processor 114, a buffer manager 116, a formatter 118, a read channel 120, a servo controller 122 for controlling the transducing head of a disc-type data storage device and a solid-state controller 124 for controlling a solid-state memory device. Unlike other hybrid controllers, for the hybrid data storage device to communicate with a host device over a bus having a NVMHCI protocol, hybrid controller 112 includes an interface 126 that corresponds with the physical bus, such as a PCIe interface, and a command interpreter 128 that works closely with the processor 114 and logic in processor 114 for making the appropriate decisions in response to NVMHCI commands.

Command interpreter 128 accepts NVMHCI commands, interprets the meaning of the commands and provides processor 114 with an appropriate input so that processor 114 can understand and make the appropriate decision-making functions. In other words, command interpreter 128 converts the NVMHCI commands into input that has meaning to processor 114. The following examples illustrate specific exemplary NVMHCI commands and how command interpreter 128 and processor 114 deals with the commands.

Figure 4:
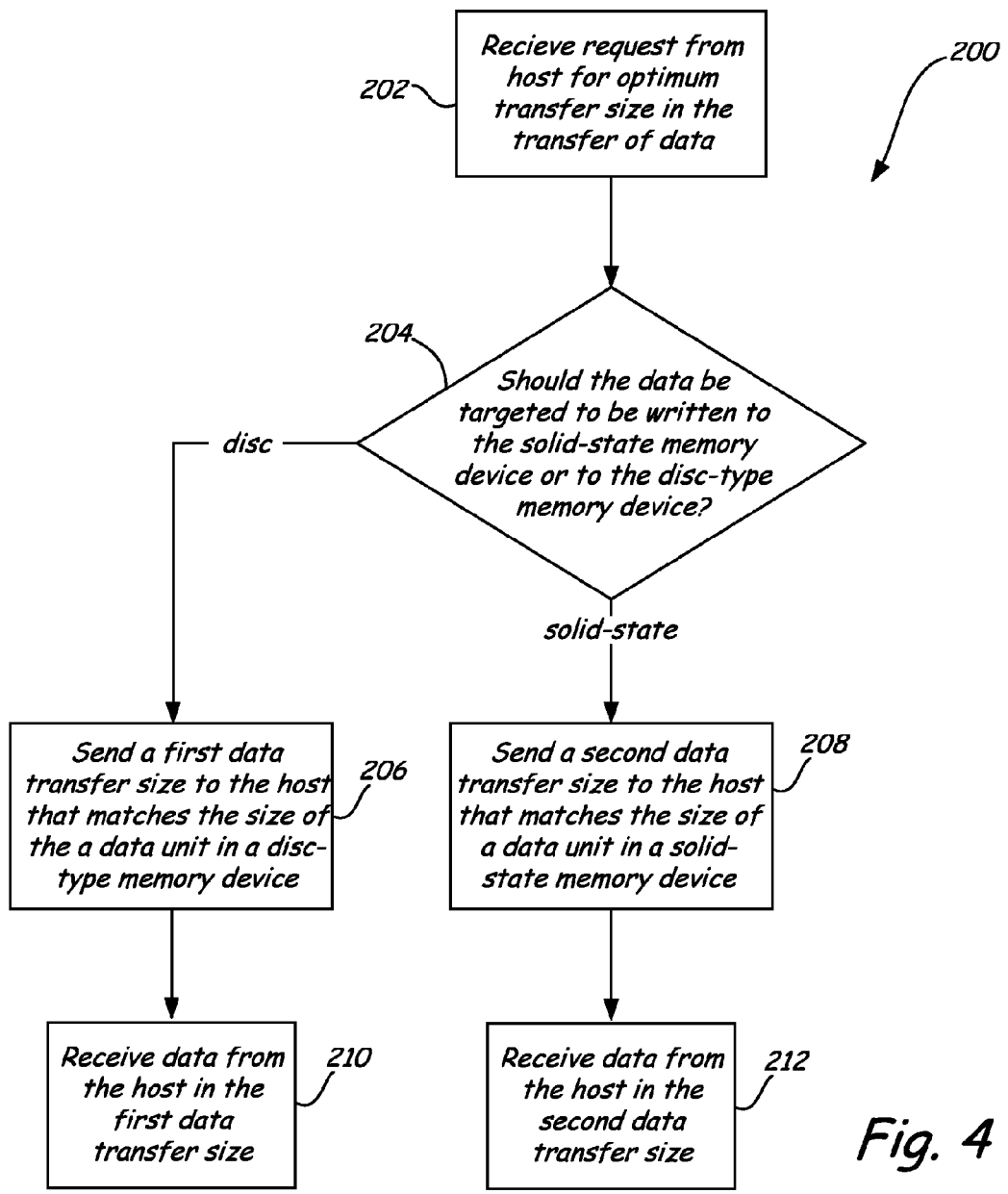
FIG. 4 is a flowchart illustrating a method of using a hybrid data storage device controller to receive a Non-Volatile Memory Host Controller Interface (NVMHCI) command under one embodiment.

FIG. 4 is a flowchart 200 illustrating an exemplary method of using a NVMHCI command in a hybrid data storage device under one embodiment. At block 202, hybrid data storage device controller 112 (FIGS. 2 and 3) receives a request from host device 102 (FIGS. 1 and 2) for an optimum transfer size in the transfer of data. Under conventional NVMHCI protocol communication with a stand-alone solid-state device, the solid-state device is able to streamline an answer to the host based on the size of a data unit in the solid-state device. However, when such a request is interpreted by command interpreter 128 and given to processor 114 in a hybrid data storage device controller 112, at block 204, processor 114 must first decide if data should be targeted to be written to solid-state memory device 106 or to disc-type memory device 108 (FIGS. 1 and 2).

If the data should be written to disc-type memory device 108, then the method proceeds to block 206 and a first data transfer size is sent to host device 102 that matches the size of a data unit in disc-type memory device 108. For example, the first data transfer size can be equivalent to the size of a data sector on a memory disc, such as the standard 512 bytes or larger sector size that includes more efficient error correction code (ECC) such as 4,000 byte sector sizes. If the data should be written to solid-state memory device 106, then the method proceeds to block 208 and a second data transfer size is sent to host device 102 that matches the size of a data unit in solid-state memory device 106. For example, the second data transfer size can be equivalent to a page size of a solid-state memory, such as 2,000 bytes. If the first data transfer size is sent, processor 114 receives data from host device 102 in the first data transfer size as illustrated in block 210. If the second data transfer size is sent, processor 114 receives data from host device 102 in the second data transfer size as illustrated in block 212.

Figure 5:
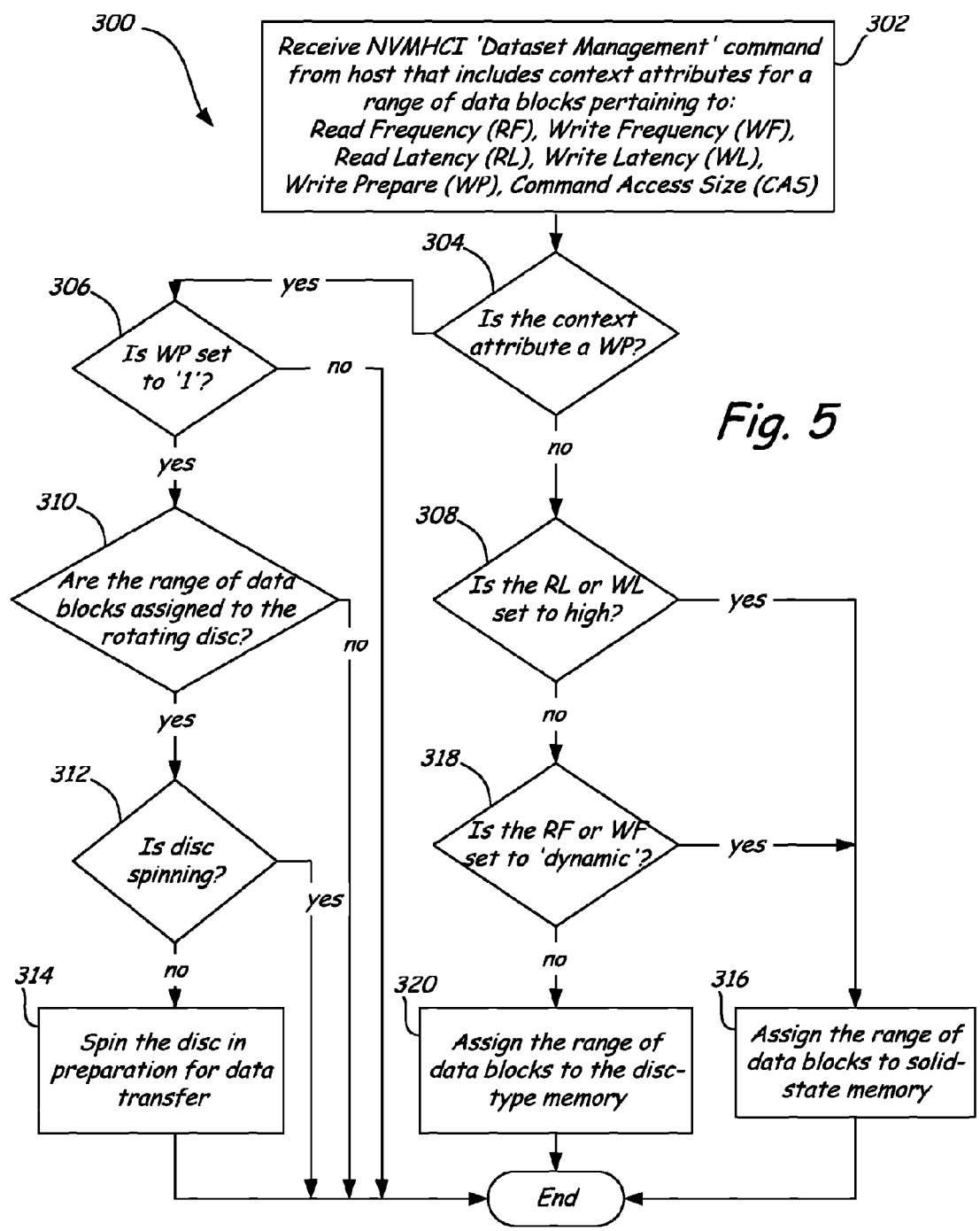
FIG. 5 is a flowchart illustrating a method of using a hybrid data storage device controller to receive a NVMHCI command under another embodiment.

FIG. 5 is a flowchart 300 illustrating another exemplary method of using a NVMHCI command in a hybrid data storage device under another embodiment. At block 302, hybrid data storage device controller 112 (FIGS. 2 and 3) receives a 'Dataset Management' command from host device 102 (FIGS. 1 and 2) that includes context attributes for a range of data blocks. Exemplary context attributes include read frequency (RF), write frequency (WF), read latency (RL), write latency (WL), write prepare (WP) and command access size (CAS). Such context attributes are those that can be provided under conventional NVMHCI protocol communication with a stand-alone solid-state device. Under conventional NVMHCI protocol communication, the solid-state device takes the context attributes and uses them to optimize performance and reliability of the solid-state memory device. However, when such a request is interpreted by command interpreter 128 and given to processor 114 in a hybrid data storage device controller 112 as disclosed, processor 114 desires to optimize performance and reliability of a hybrid data storage device. To do this, context attributes can be used to determine whether a range of data blocks should be placed in solid-state memory or in disc-type memory. Long sequential accesses are best transferred directly to or from disc-type storage memory, while short random accesses are best transferred to and from solid-state memory.

At block 304, processor 114 determines whether the context attributes includes a write prepare (WP). If it does, then the method proceeds to block 306 and determines whether the WP is set to the value '1.' If not, then the method proceeds to block 308. If the WP is not set to the value '1,' then the method ends. If the WP is set to the value '1,' then processor 114 determines whether the range of data blocks are assigned to the rotating disc as shown in block 310. If they aren't, again the method ends, but if they are, then processor 114 determines whether the disc is spinning as shown in block 312. If the disc is spinning, the disc-type memory device is already prepared for write data and the method ends. If not, at block 314, processor 114 spins up the disc in preparation for data transfer.

Referring back to block 308, if the context attributes fail to include a WP, then processor 114 determines if the read latency (RL) or the write latency (WL) is set to high. If the RL or WL is set to high, processor 114 assigns the range of data blocks to the solid-state memory device 106 as shown in block 316. If the RL or WL is not set to high, then processor proceeds to block 318 and decides if the read frequency (RF) or write frequency (WF) are set to 'dynamic.' When RF or WF are set to 'dynamic,' it means that data in the range of data blocks are read or written more than once on average per power cycle. Therefore, such data should be stored in a place that can be quickly accessed, such as the solid-state memory device 106. If either RF or WF is set to 'dynamic,' processor 114 proceeds to block 316 and assigns the range of data blocks to the solid-state memory device 106. If, however, the RF or WF are not set to 'dynamic,' then processor 114 proceeds to block 320 and assigns the range of data blocks to the disc-type memory device 108.

Figure 6:
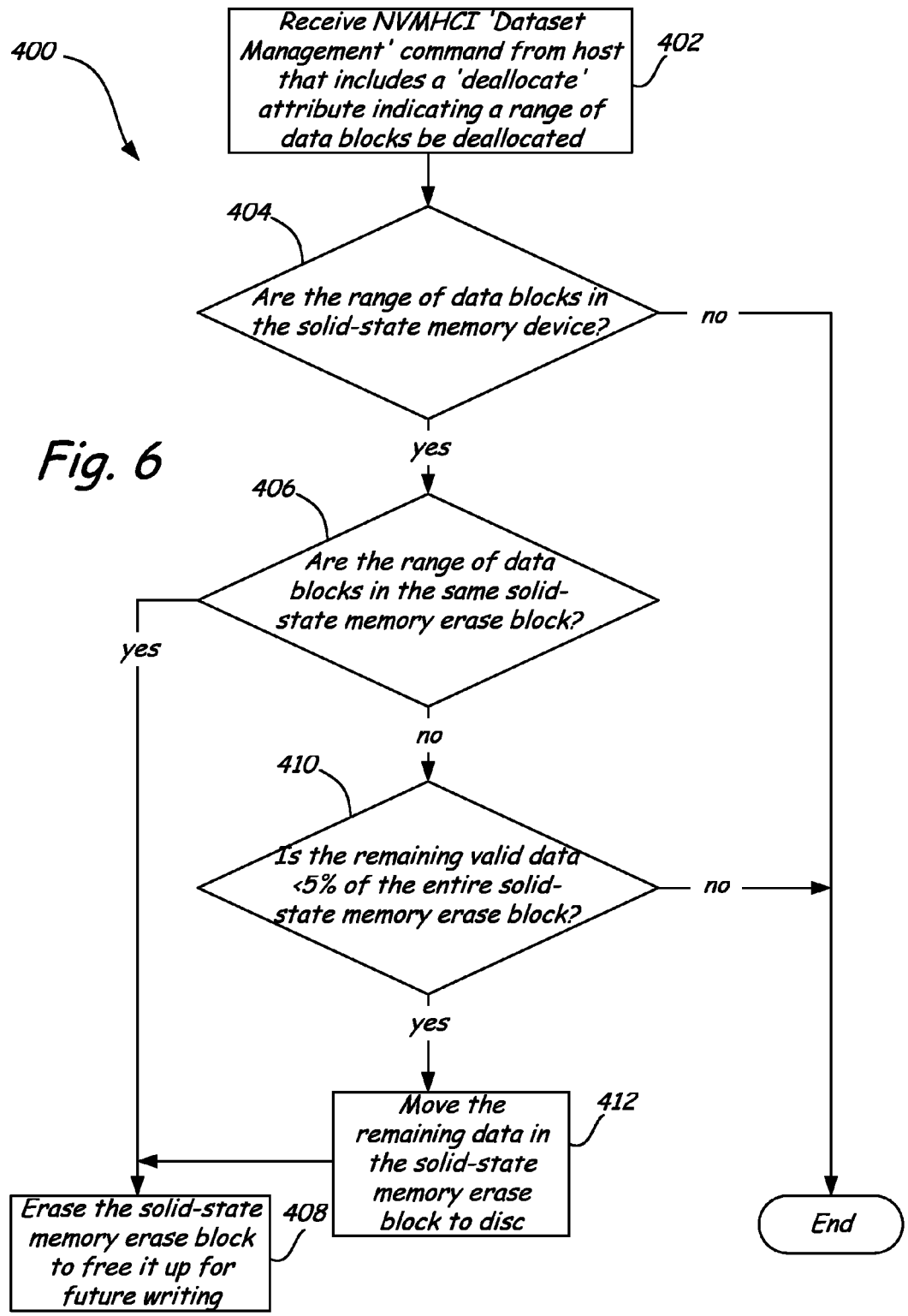
FIG. 6 is a flowchart illustrating a method of using a hybrid data storage device controller to receive a NVMHCI command under another embodiment.

FIG. 6 is a flowchart 400 illustrating another exemplary method of using a NVMHCI command in a hybrid data storage device under another embodiment. At block 402, hybrid data storage device controller 112 (FIGS. 2 and 3) receives a 'Dataset Management' command from host device 102 (FIGS. 1 and 2) that includes a 'deallocate' attribute indicating a range of data blocks to be deallocated. Such an attribute can be provided under conventional NVMHCI protocol communication with a stand-alone solid-state device. Under conventional NVMHCI protocol communication, deallocated data includes data that is no longer needed by the host. It allows stand-alone solid-state memory devices to pre-erase blocks that contain data that is no longer needed. In a hybrid storage system, it may be that data indicated as deallocated is located in disc-type memory. Therefore, processor 114 must undergo a set of logic that takes advantage of this command and provides a high performing hybrid data storage device.

At block 404, processor 114 determines whether the range of data blocks indicated as data blocks to be deallocated are in solid-state memory in the hybrid data storage device. If they aren't, then the method ends because they are in disc-type memory and need not be erased. If they are, then processor 114 proceeds to block 406 and determines if the range of data blocks is in the same solid-state memory erase block. If so, processor 114 erases the solid-state memory erase block to free up the block for future writing as illustrated in block 408. If not, processor 114 proceeds to block 410 and determines whether the remaining valid data is less than 5% of the entire solid-state memory erase block. If so, processor 114 moves the remaining data in the solid-state memory erase block to the disc-type memory device as illustrated at block 412. Otherwise, the method ends.

Figure 7:
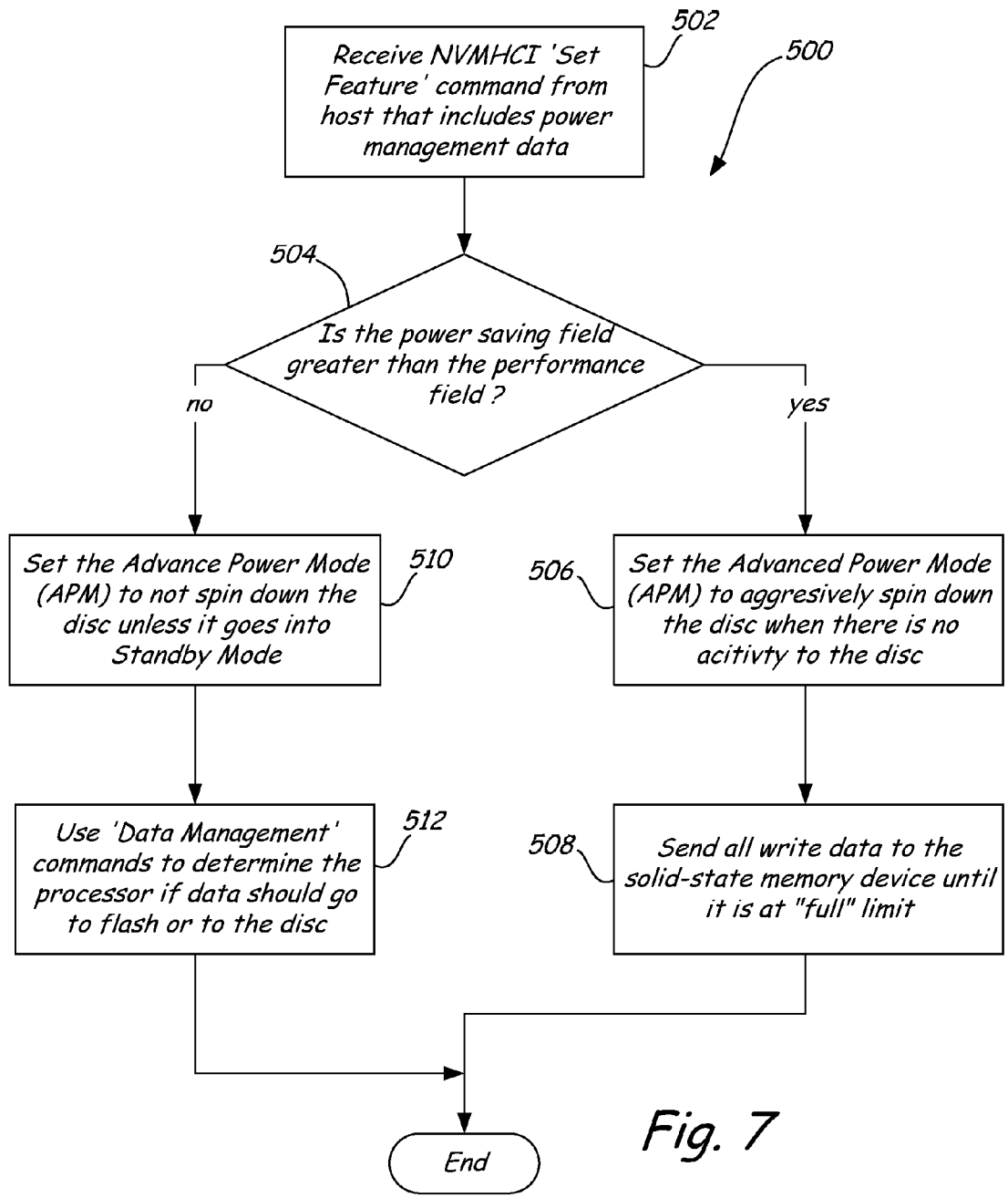
FIG. 7 is a flowchart illustrating a method of using a hybrid data storage device controller to receive a NVMHCI command under yet another embodiment.

FIG. 7 is a flowchart 500 illustrating yet another exemplary method of using a NVMHCI command in a hybrid data storage device under yet another embodiment. At block 502, hybrid data storage device controller 112 (FIGS. 2 and 3) receives a 'Set Feature' command from host device 102 (FIGS. 1 and 2) that includes power management data. Such data can be provided under conventional NVMHCI protocol communication with a stand-alone solid-state device. Under conventional NVMHCI protocol communication, power management data includes data related to power saving settings and performance settings for a stand-alone solid-state memory device. In a hybrid storage system, processor 114 can use power management data to determine if it should operate out of both the disc-type memory and solid-state memory for optimal power saving and performance or if it should operate only out of the solid-state memory for optimal power saving and performance. Therefore, processor 114 must undergo a set of logic that takes advantage of this command.

At block 704, processor 114 determines if the power saving field in the received power management data is greater than the performance field in the power management data. If it is, processor 114 sets the Advanced Power Mode (APM) to aggressively spin down the disc of the disc-type memory when there is no activity to he disc as shown in block 506. At block 508, all write data is sent to the solid-state memory device until it is full. If the power saving field is less than the performance field, then processor 114 sets the APM to not spin down the disc unless it goes into Standby Mode as shown in block 510. At block 512, 'Data Management' commands are used to determine if data should be transferred to solid-state memory or to disc-type memory.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A device comprising:
   a solid-state memory device;
   a disc-type memory device;
   a storage device controller in communication with the solid-state memory device and the disc-type memory device, the storage device controller configured to:
      receive a command from a host including a request to provide a transfer size for data to be transferred from the host to the device;
      determine if a set of data blocks associated with the command should be assigned to the solid-state memory device or to the disc-type memory device; and
      send the transfer size to the host with a first data size that corresponds to the solid-state memory device or a second data size that corresponds to the disc-type memory device.

2. The device of claim 1, wherein the second data size corresponds with a data sector size of the disc-type memory device.

3. The device of claim 1, wherein the first data size corresponds with a page size of the solid-state memory device.

4. The device of claim 1 comprising the storage device controller further configured to:
   receive context attributes from the host related to the set of data; and
   determine if the set of data should be assigned to the solid-state memory device or to the disc-type memory device based on the context attributes.

5. The device of claim 4 comprising the storage device controller further configured to:
   determine whether a read latency context attribute or a write latency context attribute designate a first latency setting;
   assign the set of data to the solid-state memory device when the read latency context attribute or the write latency context attribute designate the first latency setting; and
   assign the set of data to the disc-type memory device when the read latency context attribute and the write latency context attribute do not designate the first latency setting.

6. The device of claim 5, further comprising the storage device controller is configured to determine whether the read latency context attribute or the write latency context attribute designate the first latency setting by:
   determining whether the read latency context attribute or the write latency context attribute are set to a specific value.

7. The device of claim 4 comprising the storage device controller further configured to:
   determine whether a read frequency context attribute or a write frequency context attribute are set to indicate an average read or write frequency for the set of data that is greater than a threshold;
   assign the set of data to the solid-state memory device when the read frequency context attribute or the write frequency context attribute are set to indicate the average read or write frequency is greater than the threshold; and
   assign the set of data to the disc-type memory device when the read frequency context attribute and the write frequency context attribute are not set to indicate the average read or write frequency is greater than the threshold.

8. The device of claim 7, further comprising the threshold indicates the average read or write frequency is more than one per power cycle.

9. The device of claim 4 comprising the storage device controller further configured to:
   determine whether the set of data is assigned to the disc-type memory device when a write prepare context attribute indicates the set of data is expected to be written;
   when the write prepare context attribute indicates the set of data is expected to be written and the set of data are assigned to the disc-type memory device:
      determine whether the disc-type memory device is in a spinning state; and
      bring the disc-type memory device to the spinning state when the disc-type memory device is not in the spinning state.

10. The device of claim 9, further comprising the storage device controller configured to determine that the write prepare context attribute indicates the set of data is expected to be written when the write prepare context attribute is set to a value of 1.

11. A device comprising:
   a first non-volatile memory device;
   a second non-volatile memory device having a slower read latency or write latency than the first non-volatile memory device;

a storage device controller in communication with the first non-volatile memory device and the second non-volatile memory device, the storage device controller configured to:

receive a request from a host to provide a transfer size for data to be transferred from the host to the device;

determine if a set of data associated with the request should be assigned to the first non-volatile memory device or to the second non-volatile memory device; and send the transfer size to the host that corresponds with a first data unit size of the first non-volatile memory device or a second data unit size of the second non-volatile memory device.

12. The device of claim 11 further comprising:

the first non-volatile memory device includes a solid-state memory device;

the first data unit size corresponds with a page size of the solid-state memory device;

the second non-volatile memory device includes a disc memory device; and the second data unit size corresponds with a data sector size of the disc-type memory device.

13. The device of claim 12 comprising the storage device controller further configured to:

receive a dataset management command from the host including context attributes related to the set of data; and determine if the set of data should be assigned to the first non-volatile memory device or to the second non-volatile memory device based on the context attributes.

14. The device of claim 13 further comprising the data management command has a non-volatile memory host controller interface (NVMHCI) standard command structure.

15. The device of claim 13 comprising the storage device controller further configured to:

determine whether a read latency context attribute or a write latency context attribute are set to designate a first latency setting; and assign the set of data to the first non-volatile memory device when the read latency context attribute or the write latency context attribute designate the first latency setting.

16. The device of claim 15, further comprising the storage device controller is configured to determine whether the read latency context attribute or the write latency context attribute are set to designate the first latency setting by:

determining whether the read latency context attribute or the write latency context attribute are set to a specific value.

17. The device of claim 15 comprising the storage device controller further configured to:

when the read latency context attribute and the write latency context attribute are not set to designate the first latency setting:

determine whether a read frequency context attribute or a write frequency context attribute are set to indicate an average read or write frequency for the set of data that is greater than a threshold;

assign the set of data to the first non-volatile memory device when the read frequency context attribute or the write frequency context attribute are set to indicate the average read or write frequency is greater than the threshold; and assign the set of data to the second non-volatile memory device when the read frequency context attribute and the write frequency context attribute are not set to indicate the average read or write frequency is greater than the threshold.

18. The device of claim 17, further comprising the threshold indicates the average read or write frequency is more than one per power cycle.

19. The device of claim 17 comprising the storage device controller further configured to:

determine whether the set of data is assigned to the disc memory device when a write prepare context attribute indicates the set of data is expected to be written;

when the write prepare context attribute indicates the set of data is expected to be written and the set of data are assigned to the disc memory device:

determine whether the disc memory device is in a spinning state; and bring the disc memory device to the spinning state when the disc memory device is not in the spinning state.

20. The device of claim 19, further comprising the storage device controller configured to determine that the write prepare context attribute indicates the set of data is expected to be written when the write prepare context attribute is set to a value of 1.

* * * * *